(12) United States Patent
Kanda et al.

(10) Patent No.: US 10,252,287 B2
(45) Date of Patent: Apr. 9, 2019

(54) OPTICAL FIBER RE-COATING DEVICE (71) Applicant: FUJIKURA LTD., Tokyo (JP)

(72) Inventors: Yoshiharu Kanda, Sakura (JP); Koichi Yokota, Sakura (JP); Hiroki Yoshida, Sakura (JP)

(73) Assignee: FUJIKURA LTD., Koto-ku, Tokyo (JP)

( * ) Notice: Subject to any disclaimer, the term of this patent is extended or adjusted under 35 U.S.C. 154(b) by 0 days.

(21) Appl. No.: 14/903,824

(22) PCT Filed: Oct. 3, 2014

(86) PCT No.: PCT/JP2014/076580
§ 371 (c)(1),
(2) Date: Jan. 8, 2016

(87) PCT Pub. No.: WO2016/051597
PCT Pub. Date: Apr. 7, 2016

(65) Prior Publication Data
US 2016/0221025 A1   Aug. 4, 2016

(30) Foreign Application Priority Data

Sep. 30, 2014 (JP) .................. 2014-202263

(51) Int. Cl.
*B05C 11/10* (2006.01)
*B05C 11/11* (2006.01)
(Continued)

(52) U.S. Cl.
CPC ............ *B05C 11/1039* (2013.01); *B05C 3/12* (2013.01); *B05C 11/10* (2013.01); *B05C 11/11* (2013.01);
(Continued)

(58) Field of Classification Search
USPC ................................................. 118/325, 603
See application file for complete search history.

(56) References Cited

U.S. PATENT DOCUMENTS 3,292,577 A * 12/1966 Cressey, Jr. ............ D21H 5/003
118/603
4,409,263 A * 10/1983 Aloisio, Jr. ............. C03C 25/18
118/405
(Continued)

FOREIGN PATENT DOCUMENTS

CN      1396134 A      2/2003
CN      1464983 A      12/2003
(Continued)

OTHER PUBLICATIONS

Communication dated Mar. 22, 2017, from the European Patent Office in counterpart European Application No. 14896958.7.
(Continued)

*Primary Examiner* — Yewebdar T Tadesse
(74) *Attorney, Agent, or Firm* — Sughrue Mion, PLLC (57) ABSTRACT

An optical fiber re-coating device of the invention includes an optical fiber coater that cures resin and coats a coating-removed portion of an optical fiber therewith. The optical fiber re-coating device includes: a resin reservoir tank that stores the resin which is before subjected to curing; a pump that supplies the resin stored in the resin reservoir tank to an optical fiber coater; and an air bubble separator that separates air bubbles included in the resin from the pump therefrom, sends the resin from which the air bubbles are separated to the optical fiber coater, and returns the resin including the separated air bubbles to the resin reservoir tank.

5 Claims, 5 Drawing Sheets

(51) Int. Cl.
*B05C 3/12* (2006.01)
*G02B 6/02* (2006.01)
*C03C 25/12* (2006.01)

(52) U.S. Cl.
CPC .......... *C03C 25/12* (2013.01); *G02B 6/02033* (2013.01)

(56) References Cited

U.S. PATENT DOCUMENTS

| | | | |
|---|---|---|---|
| 4,812,186 A * | 3/1989 | McConnell | B29C 70/086 156/221 |
| 4,867,775 A * | 9/1989 | Cain | C03C 25/12 118/689 |
| 2001/0025890 A1 * | 10/2001 | Fujimoto | H01L 21/6715 239/1 |
| 2003/0026919 A1 | 2/2003 | Kojima et al. | |
| 2004/0146596 A1 | 7/2004 | Shibata et al. | |
| 2008/0231654 A1 * | 9/2008 | Watanabe | B41J 2/16532 347/30 |

FOREIGN PATENT DOCUMENTS

| | | |
|---|---|---|
| JP | 64-30334 U | 2/1989 |
| JP | 2001-314791 A | 11/2001 |
| JP | 2003-131062 A | 5/2003 |
| JP | 4193410 B2 | 12/2008 |

OTHER PUBLICATIONS

Communication dated Mar. 22, 2017, from the European Patent Office in counterpart European Application No. 144896958.7.

Communication dated Mar. 28, 2018 from the State Intellectual Property Office of the P.R.C. in counterpart Chinese application No. 201480039823.3.

Communication dated Dec. 18, 2017 from the European Patent Office in counterpart European application No. 14896958.7.

* cited by examiner

OPTICAL FIBER RE-COATING DEVICE

CROSS REFERENCE TO RELATED APPLICATIONS

This application is a National Stage of International Application No. PCT/JP2014/076580 filed Oct. 3, 2014, claiming priority based on Japanese Patent Application No. 2014-202263 filed Sep. 30, 2014, the contents of all of which are incorporated herein by reference in their entirety.

TECHNICAL FIELD

The present invention relates to an optical fiber re-coating device.

BACKGROUND ART

The following Patent Document 1 discloses a molding die that is used to coat an optical fiber and is used to form a mold portion including a first mold groove and a second mold groove by coupling a first base on which the first mold groove is formed to a second base on which the second mold groove is formed; a first position-adjusting groove into which a position-adjusting member is to be fitted is formed on a surface on which the first mold groove of the first base is formed; a second position-adjusting groove into which a position-adjusting member is to be fitted is formed on a surface on which the second mold groove of the second base is formed; a resin injection passage that is used to inject resin into the mold portion is formed on at least one of the first base and the second base; a first resin discharge groove that is used to discharge the resin from the mold portion is formed across the first mold groove and the first position-adjusting groove on the surface on which the first mold groove of the first base is formed; a second resin discharge groove that is used to discharge the resin from the mold portion is formed across the second mold groove and the second position-adjusting groove on the surface on which the second mold groove of the second base is formed; two first resin discharge grooves and two second resin discharge groove are provided thereon; and the two resin discharge grooves are positioned so as to sandwich the resin injection passage therebetween.

PRIOR ART DOCUMENTS

Patent Documents

[Patent Document 1] Japanese Patent No. 4193410

SUMMARY OF INVENTION

Problems to be Solved by the Invention

However, in the aforementioned conventional art, for example, in the case of using a tube pump that supplies resin to an optical fiber coating (corresponding to the above-described mold portion) by compressing a tube by use of a plurality of rollers, air bubbles are generated in the resin due to a negative pressure. For this reason, in the aforementioned conventional art, there is a problem in that an optical fiber is coated with the resin into which the air bubbles are mixed. Furthermore, it is also conceivable to remove air bubbles from the resin by, for example, discarding the resin including the air bubbles; however, there is a problem in that the resin is wasted due to the disposal thereof.

The invention was conceived in view of the above-described circumstances and has an object thereof to reduce the air bubbles included in resin and effectively utilize the resin.

Means for Solving the Problems

In order to achieve the aforementioned object, the invention adopts a first solution means which is an optical fiber re-coating device includes: an optical fiber coater that cures resin and coats a coating-removed portion of an optical fiber therewith; a resin reservoir tank that stores the resin which is before subjected to curing; a pump that supplies the resin stored in the resin reservoir tank to an optical fiber coater; and an air bubble separator that separates air bubbles included in the resin from the pump therefrom, sends the resin from which the air bubbles are separated to the optical fiber coater, and returns the resin including the separated air bubbles to the resin reservoir tank.

In the above-mentioned first solution means, the invention adopts a second solution means in which the air bubble separator includes a resin accumulator that has an upper position and a lower position and is a space, the upper position is connected to a resin flow-in passage into which the resin flows from the pump, the lower position is connected to a resin supply passage which sends the resin to the optical fiber coater, and the space is connected to a resin collection passage that is used to return the resin including the separated air bubbles to the resin reservoir tank, and the resin collection passage is located upper than the resin supply passage.

In the above-mentioned second solution means, the invention adopts a third solution means in which a flow rate of the resin flow-in passage is greater than a flow rate of the resin supply passage and a flow rate of the resin collection passage in the air bubble separator.

In any one of the first solution means to the third solution means, the invention adopts a fourth solution means which further includes a base that supports the optical fiber coater, wherein the resin reservoir tank, the pump, and the air bubble separator are accommodated in the base and are removable from the base in a state of being connected to each other.

In the above-mentioned fourth solution means, the invention adopts a fifth solution means in which the air bubble separator is attached to a top surface of the resin reservoir tank.

In the above-mentioned fifth solution means, the invention adopts a sixth solution means in which the air bubble separator is separable into an upper lid and a lower reservoir, and the air bubble separator is attached to a top surface of the upper lid.

Effects of the Invention

According to the invention, as a result of providing an optical fiber re-coating device including: an optical fiber coater that cures resin and coats a coating-removed portion of an optical fiber therewith; a resin reservoir tank that stores the resin which is before subjected to curing; a pump that supplies the resin stored in the resin reservoir tank to an optical fiber coater; and an air bubble separator that separates air bubbles included in the resin from the pump therefrom, sends the resin from which the air bubbles are separated to the optical fiber coater, and returns the resin including the separated air bubbles to the resin reservoir tank, it is possible to reduce the air bubbles included in the resin by separating off the air bubbles included in the resin, and it is possible to effectively utilize the resin by returning the resin including the separated air bubbles to the resin reservoir tank.

EMBODIMENTS FOR CARRYING OUT THE INVENTION

An optical fiber re-coating device A according to the embodiment is an apparatus that removes a coating (intermediate coating) of an optional intermediate portion of an optical fiber and re-coats a portion at which an optical-fiber type optical component was manufactured. Particularly, an optical fiber which is subjected to re-coating by use of the above-mentioned optical fiber re-coating device A has a cladding and a coating that coats the outer-periphery of the cladding which are concentrically formed in order from the center of an axis. Furthermore, the coating of the optical fiber is made of ultraviolet curable resins such as urethane acrylate resins, epoxy acrylate resins, polybutadiene acrylate resins, silicone acrylate resins, polyester acrylate resins.

Figure 1:
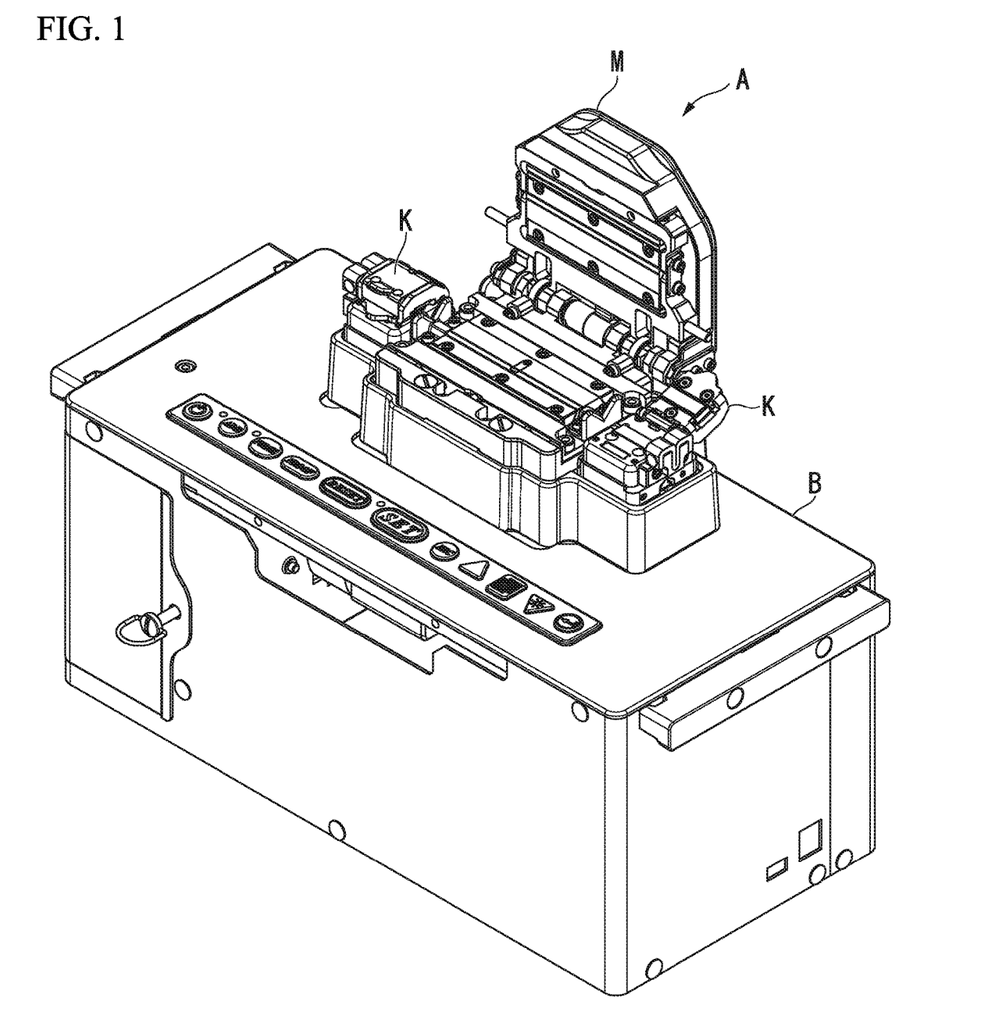
FIG. 1 is a perspective view showing an optical fiber re-coating device according to one embodiment of the invention.
Figure 2:
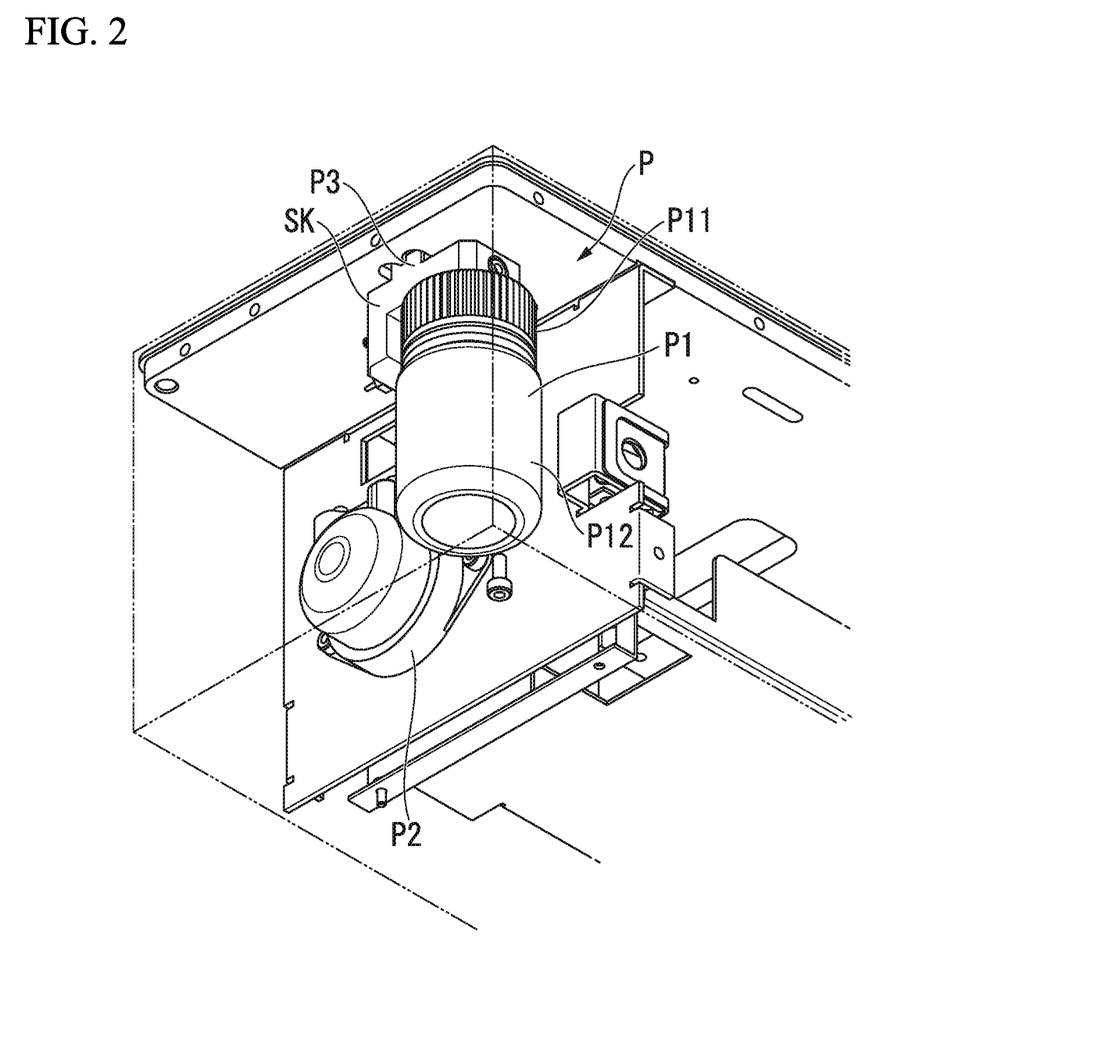
FIG. 2 is a perspective view showing a resin supply according to one embodiment of the invention.

As shown in FIGS. 1 and 2, the above-mentioned optical fiber re-coating device A is provided with an optical fiber coater M, an optical fiber holder K, a base B, and a resin supply P.

As shown in FIG. 1, the optical fiber coater M is configured to include a pair of upper and lower forming members made of a transparent material such as a silica glass.

The forming members of the above-mentioned fiber coater M include grooves which are used for re-coating and provided at the respective center portions of the surfaces which are butt-jointed to each other. When the above-described forming members are butt-jointed to each other, the above-mentioned grooves form a cavity having a substantially cylindrically-shaped air space.

At this time, the forming members of the above-mentioned fiber coater M are in a state of sandwiching the cavity therebetween at the top and bottom. In the optical fiber coater M, the lower forming member is fixed, and the upper forming member is rotatably supported around the lower edge of the lower forming member. That is, the upper forming member is configured to rotate with respect to the lower forming member so as to be switched between: a state of being butt-jointed to the lower forming member and thereby closing the cavity; and a state of separating the cavity from the upper forming member and thereby opening the cavity.

Furthermore, a resin injection port is provided on the cavity and on the lower forming member of the optical fiber coater M. The resin injection port is a hole that is used to inject a liquiform resin, that is, a pre-cured resin into the inside of the cavity from the resin supply P.

Moreover, a shielding portion made of a chrome (Cr) film is provided on the surface of the lower forming member of the optical fiber coater M which is to be butt-jointed to the upper forming member and on the portion other than the groove. The shielding portion is formed by coating the lower forming member of with chrome. The shielding portion is used so as to avoid a resin material, which is present in each of the resin injection port and an air space communicated with this resin injection port, from being irradiated with ultraviolet light that is used to cause a resin material in the cavity to be cured.

A ultraviolet light emitter is provided in the optical fiber coater M. With respect to the optical fiber coater M, the ultraviolet light emitter irradiates the injected resin with ultraviolet light. Subsequently, the resin that is irradiated with ultraviolet light is cured.

The optical fiber holder K is used to hold an optical fiber that is in a state of being extracted from both sides of the optical fiber coater M when the optical fiber is set on the optical fiber coater M.

A pair of optical fiber holders K which are located at both sides of the optical fiber coater M are provided on the base B.

Figure 3:
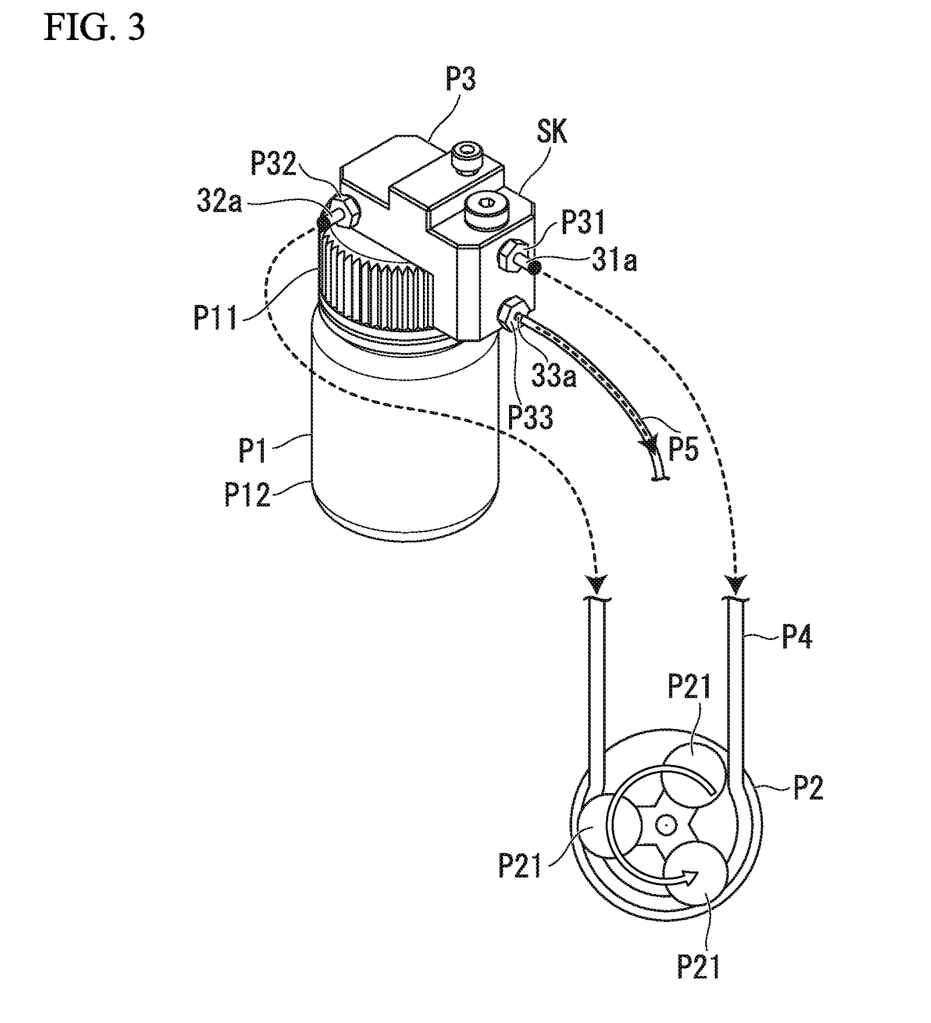
FIG. 3 is a view showing a resin reservoir tank, a resin supply pump, an air bubble separator, a first tube, and a second tube according to one embodiment of the invention.

As shown in FIGS. 2 and 3, the resin supply P is accommodated in the inside of the base B near the left side face and is used to supply a liquiform resin, that is, a pre-cured resin to the above-mentioned fiber coater M. The resin supply P is provided with a resin reservoir tank P1, a resin supply pump P2, an air bubble separator P3, a first tube P4, and a second tube P5.

The resin reservoir tank P1 is a reservoir that stores a pre-cured resin to be supplied to the optical fiber coater M. The resin reservoir tank P1 is formed in a substantially cylindrical shape, is configured to include an upper lid P11 and a lower reservoir P12, and is removable. The upper lid P11 is an openable and closable lid. The lower reservoir P12 is a container that is used to store a pre-cured resin.

As shown in FIG. 3, the resin supply pump P2 is a tube pump, the resin inside the first tube P4 is extruded by compressing the first tube P4 by a plurality of inner rollers P21, and the resin is transported from the resin reservoir tank P1 to the air bubble separator P3.

For example, the number of the aforementioned rollers P21 provided in the resin supply pump P2 is three, and the arrangement of the rollers forms is circular in shape at regular intervals around a rotation shaft as shown in FIG. 3. In the resin supply pump P2, the three rollers P21 that are arranged in a circular form rotate in a direction along the circular form around the rotation shaft, the first tube P4 is thereby compressed, and the resin is thereby transferred.

Figure 4A:
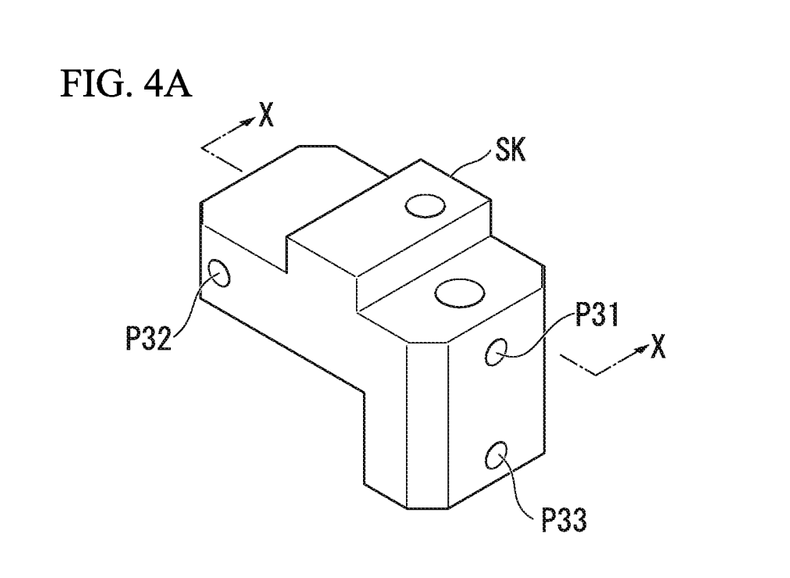
FIG. 4A is a perspective view showing the air bubble separator according to one embodiment of the invention.
Figure 4B:
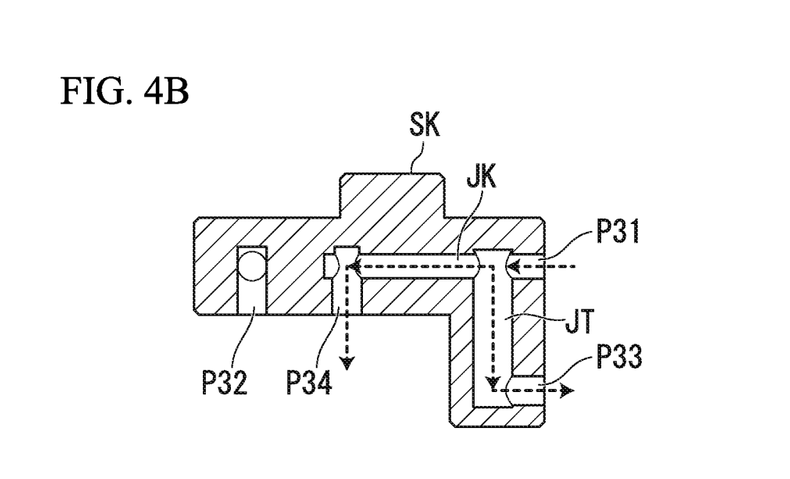
FIG. 4B is a cross-sectional view taken along the line X-X shown in FIG. 4A.

The air bubble separator P3 is attached to the above of the upper surface of the upper lid P11 of the resin reservoir tank P1, and is a mechanism that separates the air bubbles included in resin when the resin is supplied from the resin reservoir tank P1 to the optical fiber coater M through the resin supply pump P2. As shown in FIGS. 4A and 4B, the air bubble separator P3 is formed of a metal or a resin, is constituted of a body part SK having a flow passage that is formed thereinside and is used to separate air bubbles, and is provided with four openings provided at the flow passage that is used to separate air bubbles, that is, a resin flow inlet port P31 (part of a resin flow-in passage), a resin discharge port P32, a resin supply port P33 (a part of a resin supply passage), and a resin collection port P34 (a part of resin collection passage JK).

The resin flow inlet port P31 is an opening into which resin that is to be transferred by the resin supply pump P2 flows. Inside the air bubble separator P3, the resin flow inlet port P31 is connected to the resin supply port P33 and the resin collection port P34.

The resin discharge port P32 is an opening from which resin that is to be supplied to the resin flow inlet port P31 from the resin reservoir tank P1 through the resin supply pump P2 is discharged.

The resin supply port P33 is an opening which discharges, toward the optical fiber coater M, the resin that flows from the resin flow inlet port P31 into the air bubble separator P3.

The resin collection port P34 is an opening which is used to allow the resin reservoir tank P1 to retrieve resin that flows from the resin flow inlet port P31, is not discharged from the resin supply port P33 toward the optical fiber coater M, and includes air bubbles. Particularly, the aforementioned four openings, that is, the resin flow inlet port P31, the resin discharge port P32, the resin supply port P33, and the resin collection port P34 are provided with a resin flow nozzle 31a, a resin discharge nozzle 32a, a resin supply nozzle 33a, and a resin collection nozzle 34a, respectively (refer to FIGS. 3, 5A, and 5B). Moreover, the above-mentioned air bubble separator P3 will be particularly described later.

The first tube P4 is a tube made of rubber which is used to connect the resin flow inlet port P31 and the resin discharge port P32. When the resin supply pump P2 is driven, resin flows in the first tube P4 from the resin discharge port P32 toward the resin flow inlet port P31. That is, the first tube P4 is pressed by the plurality of rollers P21 of the resin supply pump P2.

The second tube P5 is a tube made of rubber which is used to connect the resin supply port P33 and the optical fiber coater M. Particularly, in the second tube P5, air bubbles are separated by the air bubble separator P3, and the resin that is supplied from the resin supply port P33 flows.

The resin reservoir tank P1, the resin supply pump P2, the air bubble separator P3, the first tube P4, and the second tube P5, which constitute the above-mentioned resin supply P, may be made of a material of a metal or a resin as long as it does not react with a liquiform resin, that is, a pre-cured resin.

Next, the air bubble separator P3 will be particularly described.

As described above, the air bubble separator P3 is attached to the above of the upper surface of the upper lid P11 of the resin reservoir tank P1 and includes the resin flow inlet port P31, the resin discharge port P32, the resin supply port P33, and the resin collection port P34 which are provided at the flow passages formed inside of the body part SK.

Figure 5A:
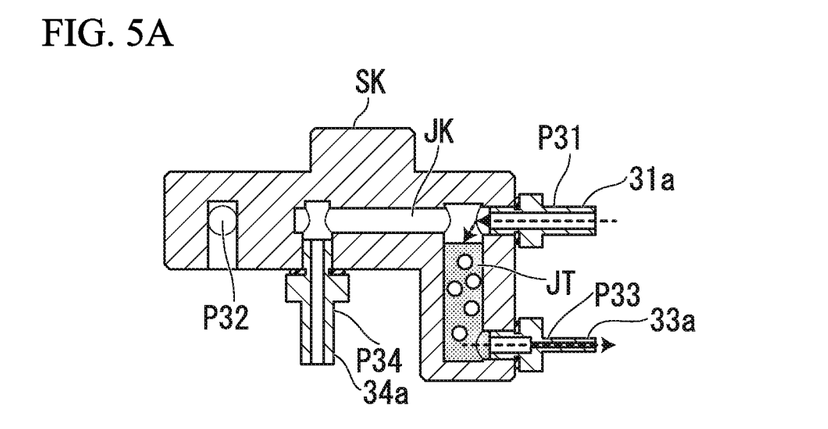
FIG. 5A is a view showing a state of air bubbles being generated in the air bubble separator according to one embodiment of the invention.
Figure 5B:
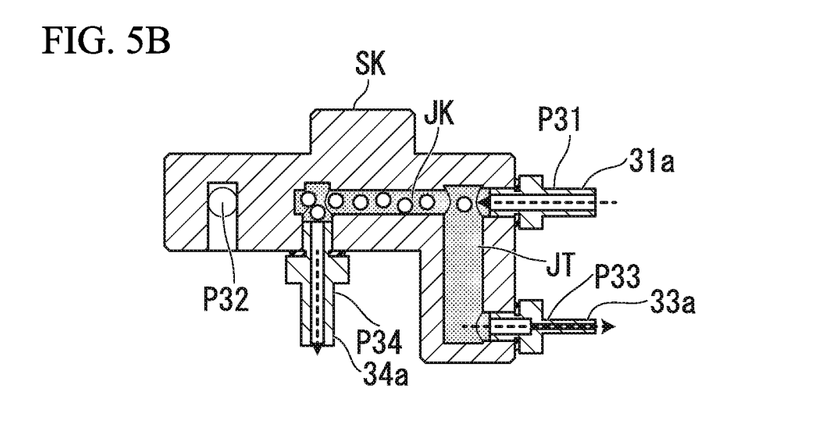
FIG. 5B is a view showing a state of air bubbles being separated from the air bubble separator according to one embodiment of the invention.

As shown in FIG. 4B, in the air bubble separator P3, a resin accumulator JT which has the resin flow inlet port P31 provided on the upper side surface and the resin supply port P33 provided on the lower side surface and which is a space formed in a substantially cylindrical-shape is formed inside the body part SK. The resin accumulator JT is part of a flow passage that is formed inside the body part SK and is used to separate air bubbles. In the embodiment, as shown in FIG. 5A, when resin flows into the resin accumulator JT from the resin flow inlet port P31, the resin is accumulated in the resin accumulator JT, and air bubbles are generated. Subsequently, since the air bubbles in the resin accumulator JT float, the air bubbles are not included in the resin that is fed from the resin supply port P33.

Additionally, on the side surface of the resin accumulator JT, the resin collection passage JK is provided at the position facing the resin flow inlet port P31. The resin collection passage JK extends in the horizontal direction from the side surface of the resin accumulator JT at a predetermined distance, further extends therefrom in the downward direction, and provides the resin collection port P34. As shown in FIG. 5A, the resin including the air bubbles in the resin accumulator JT returns to the resin reservoir tank P1 from the resin collection port P34 through the resin collection passage JK.

Moreover, regarding a relationship between the resin flow inlet port P31 and the resin collection port P34, the opening space of the resin flow nozzle 31a of the resin flow inlet port P31 is larger than the opening space of the resin collection nozzle 34a of the resin collection port P34. Consequently, it is possible to store the resin in the resin accumulator JT. Furthermore, regarding a relationship between the resin supply port P33 and the resin collection port P34, the opening space of the resin collection nozzle 34a of the resin collection port P34 is larger than the opening space of the resin supply nozzle 33a of the resin supply port P33. Accordingly, it is possible to move the air bubbles that are present inside the resin accumulator JT toward the resin collection port P34 and not to move toward the resin supply port P33. That is, the flow rate of the resin flow-in passage including the resin flow inlet port P31 is greater than the flow rate of the resin supply passage including the resin supply port P33 or than the flow rate of the resin collection passage JK including the resin collection port P34.

Furthermore, the opening space of the resin flow nozzle 31a of the resin flow inlet port P31 is larger than the total value of the opening space of the resin collection nozzle 34a of the resin collection port P34 and the resin supply nozzle 33a of the resin supply port P33. That is, the flow rate of the resin flow-in passage including the resin flow inlet port P31 is greater than the total value of the flow rate of the resin supply passage including the resin supply port P33 and the flow rate of the resin collection passage JK including the resin collection port P34. Additionally, the resin collection passage JK including the resin collection port P34 is located upper than the resin supply passage including the resin supply port P33.

Furthermore, the resin reservoir tank P1, the resin supply pump P2, and the air bubble separator P3 are accommodated in the base B and are mechanically configured to be removable from the base B in a state where they are connected to each other (that is, connected by the first tube P4 or the like).

According to the above-described embodiment, as a result of providing the optical fiber re-coating device A including: the optical fiber coater M that cures resin and coats a coating-removed portion of an optical fiber therewith; the resin reservoir tank P1 that stores the resin which is before subjected to curing; the resin supply pump P2 that supplies the resin stored in the resin reservoir tank P1 to the optical fiber coater M; and the air bubble separator P3 that separates air bubbles included in the resin from the resin supply pump P2 therefrom, sends the resin from which the air bubbles are separated to the optical fiber coater M, and returns the resin including the separated air bubbles to the resin reservoir tank P1, it is possible to reduce the air bubbles included in the resin by separating off the air bubbles included in the resin, and it is possible to effectively utilize the resin by returning the resin including the separated air bubbles to the resin reservoir tank P1.

Moreover, according to the embodiment, as a result of supplying the resin from the resin supply pump P2 to the optical fiber coater M via the above-mentioned air bubble separator P3, pulsation of the resin that is supplied to the optical fiber coater M is limited, and it is possible to stabilize the supply amount of the resin to the optical fiber coater M.

In addition, for example, in the case of using a piston pump, generation of air bubbles can be reduced; however, the configuration thereof is complicated and expensive. On the other hand, according to the embodiment, even in the case of using the resin supply pump P2 that is a tube pump, it is possible to separate air bubbles, and the configuration thereof is simple and can be realized at a low cost.

Furthermore, in the case of changing the kinds of resin, it is necessary to clean a pump or the like with alcohol. In the case of a piston pump, since the configuration thereof is complicated, it takes time for cleaning. On the other hand, according to the embodiment, in the case of changing the kinds of resin, it is necessary to clean the resin supply P with alcohol. However, the resin supply P can be cleaned by storing alcohol in the resin reservoir tank P1 and driving the resin supply pump P2, and it is possible to significantly reduce the cleaning time.

An embodiment of the invention is described above; however, the invention is not limited to the above-mentioned embodiment, for example, the following modification may be considered.

In the above-mentioned embodiment, a resin supply pump that is a tube pump is used; however, the invention may be applied to the case using a pump other than the kind of the tube pump.

DESCRIPTION OF REFERENCE NUMERAL

A . . . optical fiber re-coating device, M . . . optical fiber coater, K . . . optical fiber holder, B . . . base, P . . . resin supply, P . . . resin supply, M . . . optical fiber coater, P1 . . . resin reservoir tank, P2 . . . resin supply pump, P3 . . . air bubble separator, P4 . . . first tube, P5 . . . second tube, P11 . . . upper lid, P12 . . . lower reservoir, P21 . . . roller, JT . . . resin accumulator, JK . . . resin collection passage, P31 . . . resin flow inlet port, P32 . . . resin discharge port, P33 . . . resin supply port, P34 . . . resin collection port, SK . . . body part, 31a . . . resin flow nozzle, 32a . . . resin discharge nozzle, 33a . . . resin supply nozzle, 34a . . . resin collection nozzle

The invention claimed is:

1. An optical fiber re-coating device comprising an optical fiber coater that cures resin and coats a coating-removed portion of an optical fiber therewith, the optical fiber re-coating device comprising:
 a resin reservoir tank that stores the resin which is before subjected to curing;
 a pump that supplies the resin stored in the resin reservoir tank to the optical fiber coater; and
 an air bubble separator that separates air bubbles from the resin supplied by the pump, sends the resin from which the air bubbles are separated to the optical fiber coater, and returns the resin including the separated air bubbles to the resin reservoir tank, wherein
 the resin reservoir tank is separable into an upper lid and a lower reservoir, and
 the air bubble separator is attached to a top surface of the upper lid.

2. The optical fiber re-coating device according to claim 1, wherein
 the air bubble separator includes a resin accumulator that has an upper position and a lower position and is a space, the upper position is connected to a resin flow-in passage into which the resin flows from the pump, the lower position is connected to a resin supply passage which sends the resin to the optical fiber coater, and the space is connected to a resin collection passage that is used to return the resin including the separated air bubbles to the resin reservoir tank, and
 the resin collection passage is located upper than the resin supply passage.

3. The optical fiber re-coating device according to claim 2, wherein
 a flow rate of the resin flow-in passage is greater than a flow rate of the resin supply passage and a flow rate of the resin collection passage in the air bubble separator.

4. The optical fiber re-coating device according to claim 1, further comprising a base that supports the optical fiber coater, wherein
 the resin reservoir tank, the pump, and the air bubble separator are accommodated in the base and are removable from the base in a state of being connected to each other.

5. An optical fiber re-coating device comprising an optical fiber coater that cures resin and coats a coating-removed portion of an optical fiber therewith, the optical fiber re-coating device comprising:
 a resin reservoir tank that stores the resin which is before subjected to curing;
 a pump that supplies the resin stored in the resin reservoir tank to the optical fiber coater;
 an air bubble separator that separates air bubbles included in the resin from the pump therefrom, sends the resin from which the air bubbles are separated to the optical fiber coater, and returns the resin including the separated air bubbles to the resin reservoir tank; and
 a base that supports the optical fiber coater, wherein
 the resin reservoir tank, the pump, and the air bubble separator are accommodated in the base and are removable from the base in a state of being connected to each other, wherein
 the air bubble separator is attached to a top surface of the resin reservoir tank, wherein
 the resin reservoir tank is separable into an upper lid and a lower reservoir, and
 the air bubble separator is attached to a top surface of the upper lid.

\* \* \* \* \*